(12) United States Patent
Wang et al.

(10) Patent No.: US 10,715,612 B2
(45) Date of Patent: Jul. 14, 2020

(54) IDENTIFYING USERS' IDENTITY THROUGH TRACKING COMMON ACTIVITY

(71) Applicant: Yahoo Holdings, Inc., Sunnyvale, CA (US)

(72) Inventors: Liang Wang, San Jose, CA (US); Zhen Xia, Mountain View, CA (US); Datong Chen, Santa Clara, CA (US); Musen Wen, Sunnyvale, CA (US)

(73) Assignee: Oath Inc., New York, NY (US)

( * ) Notice: Subject to any disclaimer, the term of this patent is extended or adjusted under 35 U.S.C. 154(b) by 321 days.

(21) Appl. No.: 14/854,726

(22) Filed: Sep. 15, 2015

(65) Prior Publication Data
US 2017/0078415 A1 Mar. 16, 2017

(51) Int. Cl.
*H04L 29/08* (2006.01)
*G06Q 30/02* (2012.01)

(52) U.S. Cl.
CPC ............ *H04L 67/22* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 2006/0106793 | A1* | 5/2006 | Liang | G06F 16/3338 |
| 2006/0224615 | A1* | 10/2006 | Korn | G06Q 30/02 |
| 2006/0224624 | A1* | 10/2006 | Korn | G06F 17/30867 |
| 2007/0233671 | A1* | 10/2007 | Oztekin | G06F 16/9535 |
| 2009/0171759 | A1* | 7/2009 | McGeehan | G06Q 30/02 705/35 |
| 2010/0063969 | A1* | 3/2010 | Kasargod | G06Q 30/02 707/740 |
| 2011/0035280 | A1* | 2/2011 | Fordyce, III | G06Q 20/10 705/14.53 |
| 2011/0093474 | A1* | 4/2011 | Etchegoyen | G06Q 30/02 707/748 |
| 2011/0246306 | A1* | 10/2011 | Blackhurst | G06Q 30/02 705/14.58 |
| 2014/0129942 | A1* | 5/2014 | Rathod | H04N 21/44222 715/720 |

* cited by examiner

*Primary Examiner* — Umar Cheema
*Assistant Examiner* — Tony Williams
(74) *Attorney, Agent, or Firm* — Cooper Legal Group, LLC

(57) ABSTRACT

Systems and methods for identifying users according to their activity are disclosed. The identification of a user includes accessing a user activity log having a plurality of identifiers and corresponding activity information for each identifier, determining identifiers having correlating activity information, and assigning identifiers having correlating activity information to a common user.

20 Claims, 5 Drawing Sheets

IDENTIFYING USERS' IDENTITY THROUGH TRACKING COMMON ACTIVITY

BACKGROUND

1. Technical Field Text

The disclosed embodiments are related to Internet advertising and more particularly to systems and methods for matching users' identity through tracking online activity.

2. Background Information

Internet advertising is a multi-billion dollar industry and is growing at double-digit rates in recent years. It is also the major revenue source for internet companies such as Yahoo!® that provide advertising networks that connect advertisers, publishers, and Internet users. As an intermediary, these companies are also referred to as advertiser brokers or providers. New and creative ways to attract attention of users to advertisements ("ads") or to the sponsors of those advertisements help to grow the effectiveness of online advertising, and thus increase the growth of sponsored and organic advertising. Publishers partner with advertisers, or allow advertisements to be delivered to their web pages, to help pay for the published content, or for other marketing reasons.

Accurate identification of an Internet user's identity plays a critical role in targeted advertising. Internet users may be tracked using non-login IDs such as cookies and mobile device IDs. For instance, a cookie may be used as a unique identifier for visitors using a conventional browser, while a mobile device ID may be used as a unique identifier for mobile devices. The consistency of a unique identifier has direct impact on the quality of users' targeting profiles as the more data points can be collected from a user's online activities the more knowledge can be ascertained for advertising purposes.

The consistency of non-login IDs is always a big challenge. For example, a cookie can simply vanish due to cookie churn, or a device ID can suddenly become inactive after a user updates his/her device. Fundamentally, a non-login ID is not really a unique identifier for a user. It is a temporal identifier for a snapshot of one particular slice of a user's online activity. The wide adoption of mobile devices makes the issue even more complicated. Currently, a user often switches from device to device (for instance, from a desktop to a tablet or a phone), resulting in many different identities being assigned to a single user.

The consistency issue leads to two direct impacts on advertising. One is poor profiling for "new" IDs. A targeting system is not able to construct a good profile for a new cookie or a new device ID because of lacking of browsing history. A poor targeting profile is less effective for targeted ads serving and therefore will miss out on potential advertising revenue. The other bad impact is that broken IDs cannot guarantee frequency capping in ad delivery. Frequency capping is often required by advertisers to effectively reach diversified audience with ad creative. Broken IDs may represent an individual user as multiple individuals. The same ad may be exposed to an individual many more times than what is expected under its frequency capping maxima. A non-guaranteed frequency capping may keep impression-based advertisers from doing business with a particular ad broker.

Advertisers may worry about wasting money on their ad campaigns. Turning to the performance-based world, especially the programmatic audience buying market, an ad system may lose profit for performance-based campaigns because the click/conversion of individuals can be dragged down by wasting impressions on a same individual.

This problem of ID mapping across changing device ID's and times has been addressed in the past by using user login IDs or by considering an IP address as an identifier. However, both login IDs and IPs have limitations when addressing this problem. Login IDs have very limited coverage, even for a large internet company that has hundreds of million login users. The matching IDs through login signals is still less 20%. ID matching using IPs has a better coverage since every device on the internet has an IP address. This method matches IDs that share the same IP address, assuming that they are the same individual. However, this method is less accurate because an IP address can be shared by multiple users at the same time (e.g., corporate IP, Wi-Fi, proxy et al), or a pool of IP addresses may be shared between many users.

Thus, there exists a technical problem of how to identify a user that may be using multiple devices at different times. The particular context of the problem is described herein as an advertising system having users with multiple internet devices. However, the solutions described herein may be readily extended to other systems in which a user using multiple devices needs to be identified.

BRIEF SUMMARY

In one aspect, a method of identifying a user includes accessing a user activity log comprising a plurality of identifiers and corresponding activity information for each identifier, determining identifiers having correlating activity information, and assigning identifiers having correlating activity information to a common user. In some embodiments, determining identifiers having correlating activity information includes filtering the user activity log to exclude activity associated with popular activities, building an inverted index of the filtered user activity log, the inverted index having the activity information as a key and set of identifiers associated with the activity as data, enumerating the possible combinations of identifiers to form potential user groups, and scoring each of the potential user groups based on correlating activity information In some embodiments, the identifiers are selected from the group consisting of hardware identifiers, cookies, and device profiles. In some embodiments, the activity information comprises information is selected from the group consisting of internet browsing activity, online shopping activity, and internet app usage.

In some embodiments, enumerating the possible combinations of identifiers includes enumerating a limited number of user combinations, grouping the user combinations according to common sites, and merging user combinations having common sites.

In some embodiments, filtering the activity data includes ranking the activity information according to inverse popularity and selecting only those internet activities having a ranking higher than a threshold. In some embodiments, the user groups are scored according to a quantity of common websites. In some embodiments, the user groups are scored according to a sum of the inverse document frequency for each common website.

In another aspect, a system for identifying a group of activities having a common user is disclosed. The system includes a processor configured to implement computer instructions, a first data store storing data representing correlations of identifiers and activity associated with the identifiers, and a second data store storing computer executable instructions, that when implemented by the processor, cause the system to perform functions. The functions include accessing first data store to retrieve the data representing correlations of identifiers and activity associated with the identifiers, determining identifiers having correlating activity, and assigning identifiers having correlating activity to a common user.

In some embodiments, determining identifiers having correlating activity includes filtering the data to exclude activity associated with popular activities, building an inverted index of the filtered data, the inverted index having the activity as a key and set of identifiers associated with the activity as data, enumerating the possible combinations of identifiers to form potential user groups, and scoring each of the potential user groups based on correlating activity information.

In some embodiments, identifiers are selected from the group consisting of hardware identifiers, cookies, and device profiles. In some embodiments, the activity information comprises information selected from the group consisting of internet browsing activity, online shopping activity, and internet app usage.

In some embodiments, enumerating the possible combinations of identifiers includes enumerating a limited number of user combinations, grouping the user combinations according to common sites, and merging user combinations having common sites.

In some embodiments, filtering the activity data includes ranking the activity information according to inverse popularity and selecting only those internet activities having a ranking higher than a threshold.

The system of claim 10, wherein the user groups are scored according to a quantity of common websites. In some embodiments, the user groups are scored according to a sum of the inverse document frequency for each common website.

In another aspect, a computer readable storage media is disclosed. The computer readable storage media stores data including a plurality of identifiers, and data linking groups of the plurality of identifiers based on the historical activity of the identifiers.

In some embodiments, the plurality of identifiers comprise cookies. In some embodiments, wherein the activity of the identifiers comprises browsing history.

DETAILED DESCRIPTION

Figure 1:
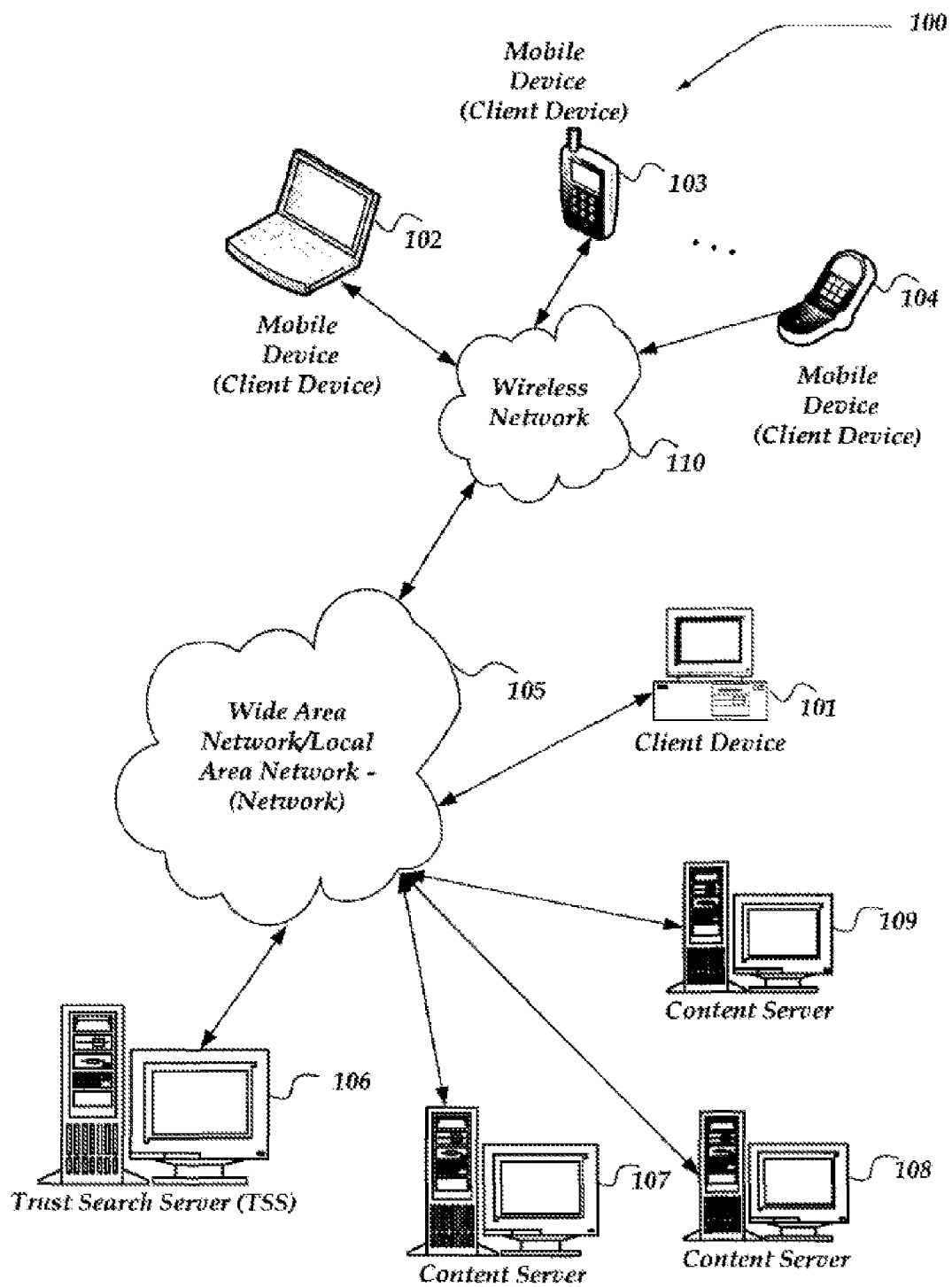
FIG. 1 illustrates a network

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The claimed subject matter is related to monetization of advertising. Various monetization techniques or models may be used in connection with advertising, including banner advertisements, rich media advertisements, video advertisements, advertising associated with user search queries, or non-sponsored search advertising, including graphical or display advertising. In an auction type online advertising marketplace, advertisers may bid in connection with placement of advertisements, although other factors may also be included in determining advertisement selection or ranking. Bids may be associated with amounts advertisers pay for certain specified occurrences, such as for placed or clicked on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

The disclosed subject matter further relates to systems and methods for identifying a user through their online activity. The described systems and methods are able to identify a user despite changing device identifiers, cookies, and IP addresses associated with the user. The user identification may be used to target advertisements or enhance the performance of an advertising campaign.

When a user browses the internet, or performs some type of web interaction, possibly through an app, the user's activity may be tracked through a tracking cookie, the IP address may be logged, or a device identifier may be recorded. This logging may be performed by an advertising service displaying ads on a user's device. This logged information is then analyzed to match identifiers to common users. Once a common user is identified, profiles or other information may be merged between the different identifiers to obtain a common user profile.

Ad Network

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

Illustrative Environment

FIG. 1 is a schematic diagram illustrating an example embodiment of a network 100. Other embodiments that may vary, for example, in terms of arrangement or in terms of type of components, are also intended to be included within claimed subject matter. As shown, FIG. 1, for example, includes a variety of networks, such as local area network (LAN)/wide area network (WAN) 105 and wireless network 110, a variety of devices, such as client device 101, mobile devices 102, 103, and 104, and a variety of servers such as content servers 107, 108, and 109, and search server 106.

The network 100 may couple devices so that communications may be exchanged, such as between a client device, a search engine, and an ad server, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
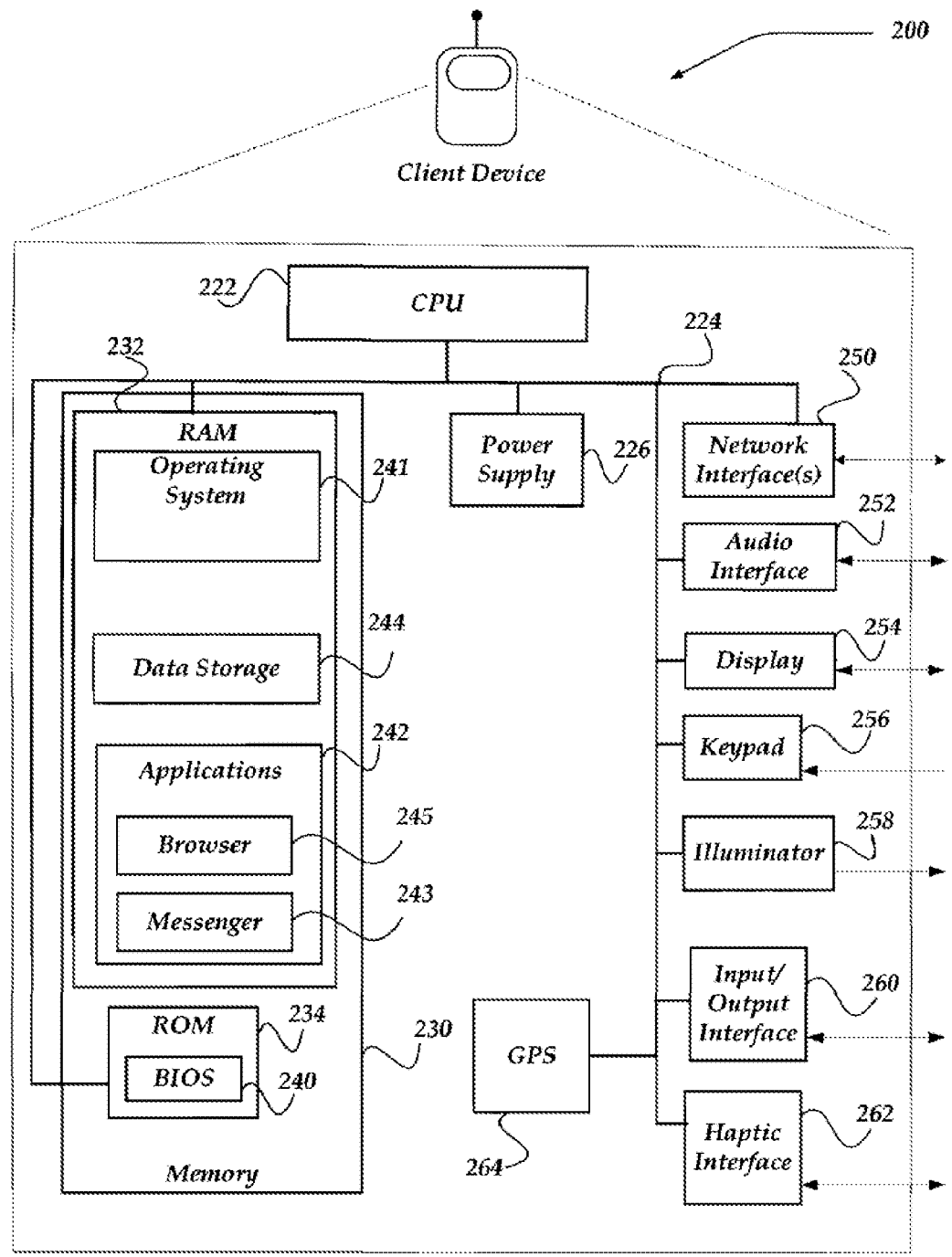
FIG. 2 illustrates a computing device.

FIG. 2 illustrates an example schematic of an embodiment of a computing device 200. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services, such as search services, indexing services, file services, email services, communication services, and content services. Servers vary in application and capabilities and need not contain all of the components of the exemplary computing device 200. Additionally, a server may contain additional components not shown in the exemplary computing device 200. In some embodiments a computing device 200 may operate as both a client device and a server.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. As explained previously, once a common user is identified, a profile may be merged among the identifiers to establish a common user profile, which may then be used to target advertisements for each of the identifiers.

An "ad server" comprises a server that stores online advertisements for presentation to users. "Ad serving" refers to methods used to place online advertisements on websites, in applications, or other places where users are more likely to see them, such as during an online session or during computing platform use, for example.

Overview of Identifier Matching

A user may change devices and locations multiple times in a day, making it difficult to track a user consistently. For example, a user may have a home computer, a work computer, and a smart phone, each or which may have different identifiers. While a user may change their devices, their usage patterns may remain similar. For example, a user may consistently visit particular webpages across their devices and may use apps that correspond to particular web properties.

Throughout this application, an identifier may be a cookie, a device identifier, an Internet account, or any other identifier that uniquely identifies a property associated with a user. Therefore, the described systems and method may be applied to identifying a user's identity associated with any mobile devices and any Internet account (e.g., Facebook account, eBay account, PayPal account, to name a few).

Figure 3:
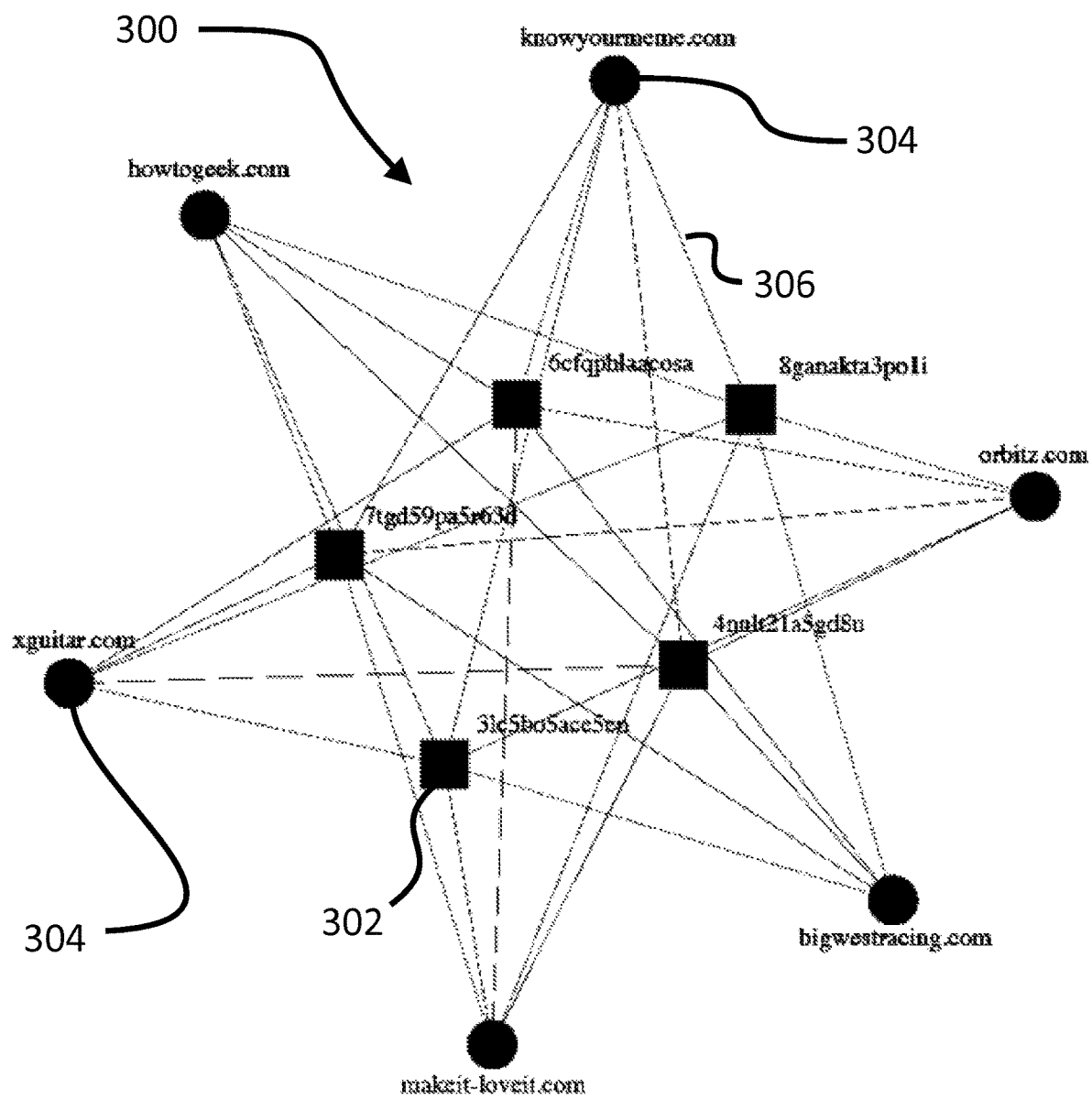
FIG. 3 illustrates a graph showing identifiers linking websites.

As a practical example, FIG. 3 illustrates a graph 300 of identifiers in the form of cookies 302, websites 304, and edges 306 associating the cookies with the websites. In this example there are five cookies 302 and six websites 304 as follows:

Cookies
  3lc5bo5ace5en
  4nnlt21a5gd8u
  6cfqphlaacosa
  7tgd59pa5r63d
  8ganakta3po1i Websites
  bigwestracing.com
  howtogeek.com
  knowyourmeme.com
  makeit-loveit.com
  orbitz.com
  xguitar.com These five cookies 302 appear unrelated, and indeed may be from different devices and IP addresses. A conventional IP based matching would not link the five cookies 302 together, as they do not share any common IP addresses. However, these five cookies 302 actually belong to a single individual. The described systems and methods successfully capture the identity of this individual based on the pattern that five cookies 302 consistently show up at six websites 304. Intuitively, it is not surprising to see that a popular website is visited by a number of users, but it is useful to observe that a set of websites may be visited by a common set of cookies, especially if the set of websites are less popular.

It is relatively simple to see the relation of FIG. 3, since only the cookies 302 associated with a single user are shown and the number of web sites 306 is limited to six. However, a real world application the relations are not so simple to observe, as there may be millions of cookies 302, websites 304, and users.

The disclosed systems and methods described below will illustrate an effective approach to identify these relationships from data representing identifiers and activity data. The method may be carried out in as few as four steps depending on the complexity of the data. For more complex data sets, it may be necessary to perform additional steps to reduce the amount of computation necessary.

Briefly, the method for identifying users includes filtering of the data to exclude popular websites, indexing the data with websites as a key and users as values, enumerating the possible combinations of users, and scoring each of the enumerated groups of users. Large datasets may require additional steps to reduce the computational workload. In such systems the enumerated combinations of users are limited to small combinations of users and the enumerated combinations are grouped according to common websites. The user groups are then merged together so that each user groups shares the same set of websites, producing an updated table of users and sites. This updated table may then be scored to find user groups having a high likelihood of being the same user. Each of these steps will now be described in further detail.

Filtering

During the filtering step popular websites such as Yahoo.com, Google.com, Microsoft.com, etc. are excluded because they are shared by many users and contribute very little to the uniqueness of a user. Because many users regularly use common search engine, there is little information to be gained recognizing that a user has visited the search engine. However, it a user were to visit a relatively less popular website, such as a local news site, there may be valuable information since a relatively smaller set of users would visit the local news site on a regular basis. For example, a user may start an internet session at yahoo.com, then visit other less popular websites regularly. The yahoo.com website would likely be filtered, but other less popular sites may remain.

The filtering step may be done using a metric known as the inverse document frequency (IDF), which is a metric used in information retrieval. In this instance the document corresponds to a website. The IDF for a website is defined as follows. Suppose there are N users, and website i is visited by $n_i$ users of the N users. Then $IDF_i = \log(N/n_i)$. Basically, this metric considers a website less important (in terms of the importance for identifying a unique user) if it is visited by many users out of the group of total users. The less visitors, the higher the score. Table 1 shows an example data set for the top 10 popular websites sorted by IDF. This is merely one example, the numbers may vary for other data sets.

TABLE 1

| Website | IDF Score |
|---|---|
| yahoo.com | 2.2339 |
| xuite.com | 2.4511 |
| ettoday.net | 2.6559 |
| buzzhand.com | 2.8170 |
| weibo.com | 3.0808 |
| dialymotion.com | 3.4324 |
| youtube.com | 3.6568 |
| life.com.tw | 3.7098 |
| facebook.com | 3.7275 |
| aswers.com | 3.8019 |

If the filtering step were to set an IDF threshold of 3, the first four websites would be removed. Setting an IDF threshold value 6.0 would have removed about 100 popular websites.

The result of the filtering step is a table stored in memory or disk correlating users and websites, with the most popular websites removed, such as a user-site table. Table 2 illustrates an example of such a user-site table:

TABLE 2

| user1 | site1, site4 |
|---|---|
| user2 | site1, site3, site5 |
| user3 | site1, site2, site3, site4, site5 |
| user4 | site1, site2, site3, site4 |
| user5 | site1, site2, site3, site4 |
| user6 | site3, site5 |

Of course, in a real world example the number of users and websites would be much greater than what is shown in Table 2.

Indexing

During the indexing step, an inverted index table is built from the user table with the key (index) being each of the websites, and the values being the set of m users that visited the website. An inverted index table based on the data of Table 2 is shown below as Table 3.

TABLE 3

| site1 | user1, user2, user3, user4, user5 |
|---|---|
| site2 | user3, user4, user5 |
| site3 | user2, user3, user4, user5, user6 |
| site4 | user1, user3, user4, user5 |
| site5 | user2, user3, user6 |

This table is stored in memory or disk and indicates that site1 is visited by user1, user2, user3, user4, and user5. The inverted index table is then used as a quick lookup table. For example, to query all users that visited site3, consult the inverted index table for site3.

Enumeration

During the enumeration step, all possible combinations of a subset of n users of those m users visiting a given site are collected. Here we assume m n (when m=n, there is just one combination, that is, the set of users itself). The maximum number of possible user combinations is $$C_m^n = \frac{m!}{n!(m-n)!}.$$

The number of combinations can be huge with a varying value of n, especially when the number of users m visiting a website is large. For example, using the data of Table 3, if there are a total of five users visiting site1, then there is one set of five users, five sets of four users, ten sets of three users, ten sets of two users, and five sets of a single user, for a total of 31 different user combinations. Doubling the number of users to a site to ten increases the total number of combinations to 1023 different combinations.

Because the number of combinations quickly scales out of control, it is beneficial to reduce the number combinations to a reasonable level. This may be accomplished by providing a selected set of numbers n, and introducing a grouping step and a merging step. For instance, assuming n is set to three, n may be representative that a user might have been using three devices such as a desktop, a laptop, and a phone.

The previous step of enumerating, but with a limitation of three users generates the data of Table 4.

TABLE 4

| site1 | {user1, user2, user3}, {user1, user2, user4}, {user1, user2, user5}, {user1, user3, user4}, {user1, user3, user5}, {user1, user4, user5}, {user2, user3, user4}, {user2, user3, user5}, {user2, user4, user5}, {user3, user4, user5} |
|---|---|
| site2 | {user3, user4, user5} |
| site3 | {user2, user3, user4}, {user2, user3, user5}, {user2, user3, user6}, {user2, user4, user5}, {user2, user4, user6}, {user2, user5, user6}, {user3, user4, user5}, {user3, user4, user6}, {user3, user5, user6}, {user4, user5, user6} |
| site4 | {user1, user3, user4}, {user1, user3, user5}, {user1, user4, user5}, {user3, user4, user5} |
| site5 | {user2, user3, user6} |

Of note, site1 has ten user groups, whereas in a conventional enumeration it would have thirty one different user groups.

Grouping

The reduced enumerated table, as shown as Table 4, is then grouped to obtain combinations of users and the common sites that users visited. For example, looking at the combination of {user1, user2, user3} in Table 4, it can be seen that they visited site1 only. Similarly, {user3, user4, user5} visited site1, site2, site3, and site4.

Grouping the combinations and their common sites produces table 6, which has user groups as a key, and the sites they visited as data.

TABLE 5

| {user1, user2, user3} | {site1} |
| {user1, user2, user4} | {site1} |
| {user1, user2, user5} | {site1} |
| {user1, user3, user4} | {site1, site4} |
| {user1, user3, user5} | {site1, site4} |
| {user1, user4, user5} | {site1, site4} |
| {user2, user3, user4} | {site1, site3} |
| {user2, user3, user5} | {site1, site3} |
| {user2, user4, user5} | {site1, site3} |
| {user3, user4, user5} | {site1, site2, site3, site 4} |
| {user2, user3, user6} | {site3, site5} |
| {user2, user4, user6} | {site3} |
| {user2, user5, user6} | {site3} |
| {user3, user4, user6} | {site3} |
| {user3, user5, user6} | {site3} |
| {user4, user5, user6} | {site3} |

Merging

Once the data is grouped according to common websites, the groups are merged together based on having a common set of websites. For example, in table 5, the groups of {user1, user2, user3}, {user1, user2, user4} and {user1, user2, user5) each share site1 as a common set of websites. Therefore the three groups may be merged together to form a group of {user1, user2, user3, user4, user5}.

Using the data of table 5, this step generates table 6 as follows:

TABLE 6

| {user1, user2, user3, user4, user5} | {site1} |
| {user1, user3, user4, user5} | {site1, site4} |
| {user2, user3, user4, user5} | {site1, site3} |
| {user3, user4, user5} | {site1, site2, site3, site4} |
| {user2, user3, user6} | {site3, site5} |
| {user2, user3, user4, user5, user6} | {site3} |

There are now 6 difference combinations that need to be scored to find groups with common users. In contrast, without the grouping and merging steps, there were 31 different combinations that would need to be considered.

Scoring

Once the enumerated table is generated, either with all of the user groups, or the reduced enumerated group, the user groups need to be scored to determine which user groups are most likely to belong to a single user. During the scoring step, the merged user groups are ranked based on the common websites they visited. One simple scoring strategy is to count the number of websites each merged user group shared. For instance, using the data of Table 6, replacing the list of websites by their counts yields Table 7.

TABLE 7

| {user1, user2, user3, user4, user5} | 1 |
| {user1, user3, user4, user5} | 2 |
| {user2, user3, user4, user5} | 2 |
| {user3, user4, user5} | 4 |

TABLE 7-continued

| {user2, user3, user6} | 2 |
| {user2, user3, user4, user5, user6} | 1 |

Based on this metric, user3, user4, and user5 are most likely to correspond to a single user. This scoring strategy assumes that all websites have contributed equally to the identification of the uniqueness of a user. Intuitively, however, a rare website should be more important than a popular website. Put another way, if two users visited a same rare website, they should be more similar than visiting a same popular website. Thus, a better scoring strategy should take into account the importance of each website in a merged user group. The importance of a website can be measured using the IDF metric introduced in the above.

Each user group typically has more than one website associated with it. The weighted average of the IDF of all websites associated with a user group is used to get a single score, $\Sigma_{w_i} \times idf_i$. This weighted score is shown in Table 8 below using the data of Table 7. This score is unbounded, and a high score would indicates a high probability that users in the group belong to the same individual. The score may be further transformed from the unbounded score into a score between 0 and 1000 using a sigmoid function $$1000 \times \left( \frac{1}{1 + e^{-\Sigma_i w_i \times idf_i}} \right),$$

as shown in the last column of table 8. This score is called a "cluster" score—a high cluster score would indicate a high probability that users in the group belong to the same individual. The weights $w_i$ are determined through a model trained with historical data. Where no historical data exists, weights are assigned to be uniform or to be set based on domain knowledge.

TABLE 8

| {user1, user2, user3, user4, user5} | 0.1823 | 545 |
| {user1, user3, user4, user5} | 0.5878 | 642 |
| {user2, user3, user4, user5} | 0.3646 | 590 |
| {user3, user4, user5} | 1.4633 | 812 |
| {user2, user3, user6} | 0.8755 | 705 |
| {user2, user3, user4, user5, user6} | 0.1823 | 545 |

In the example of table 8, it is clear that the group of {user3, user4, user 5} has the highest cluster score (812). There is therefore a high probability that these three users are the same individual. A threshold cluster score may be set for the data such that any group above the threshold is considered to be the same user, and any group below the threshold is unlikely to be the same user. Setting a higher score threshold would produce more precise clusters (that is, lower false positives), but the coverage (that is, finding more same individuals with different identities) would be lower. In contrast, setting a lower threshold would increase the coverage, but would lead to more false positives.

Figure 4:
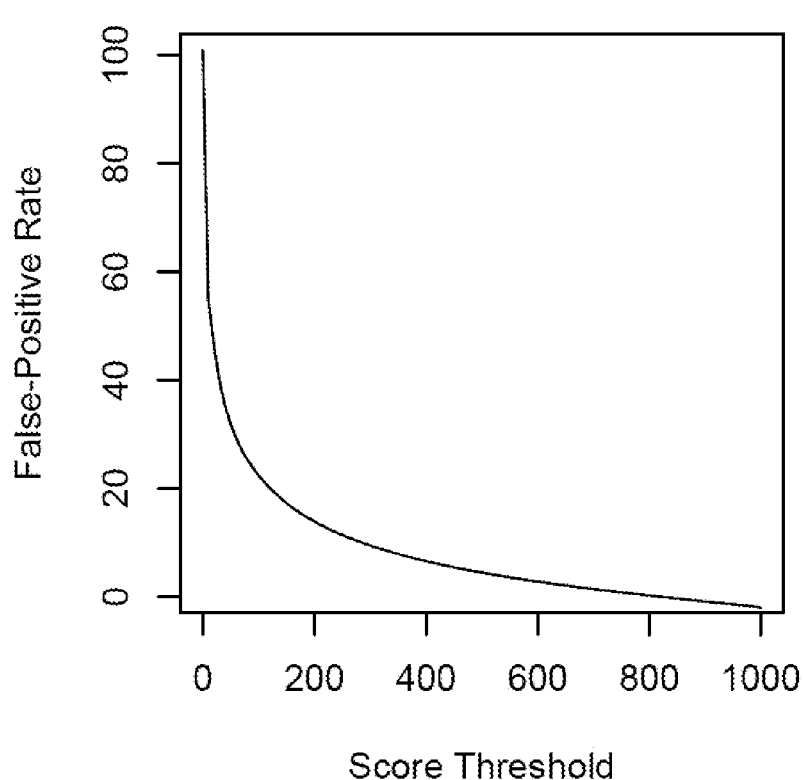
FIG. 4 illustrates a chart showing a false-positive rate.
Figure 5:
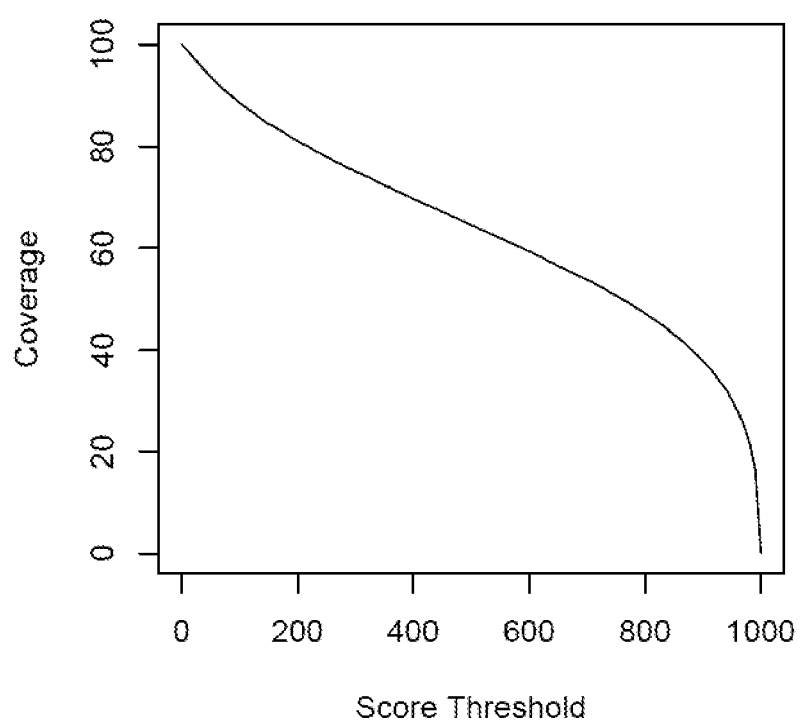
FIG. 5 illustrates a chart showing coverage of the method.

FIGS. 4 and 5 illustrates a curve that may be used to determine an appropriate threshold score. FIG. 4 illustrates a false-positive rate vs. score threshold, while FIG. 5 illustrates coverage vs. score threshold. If a threshold score of 800 is chosen, the method would cover about 50% of the user groups with a false positive rate of around 10%.

Figure 6:
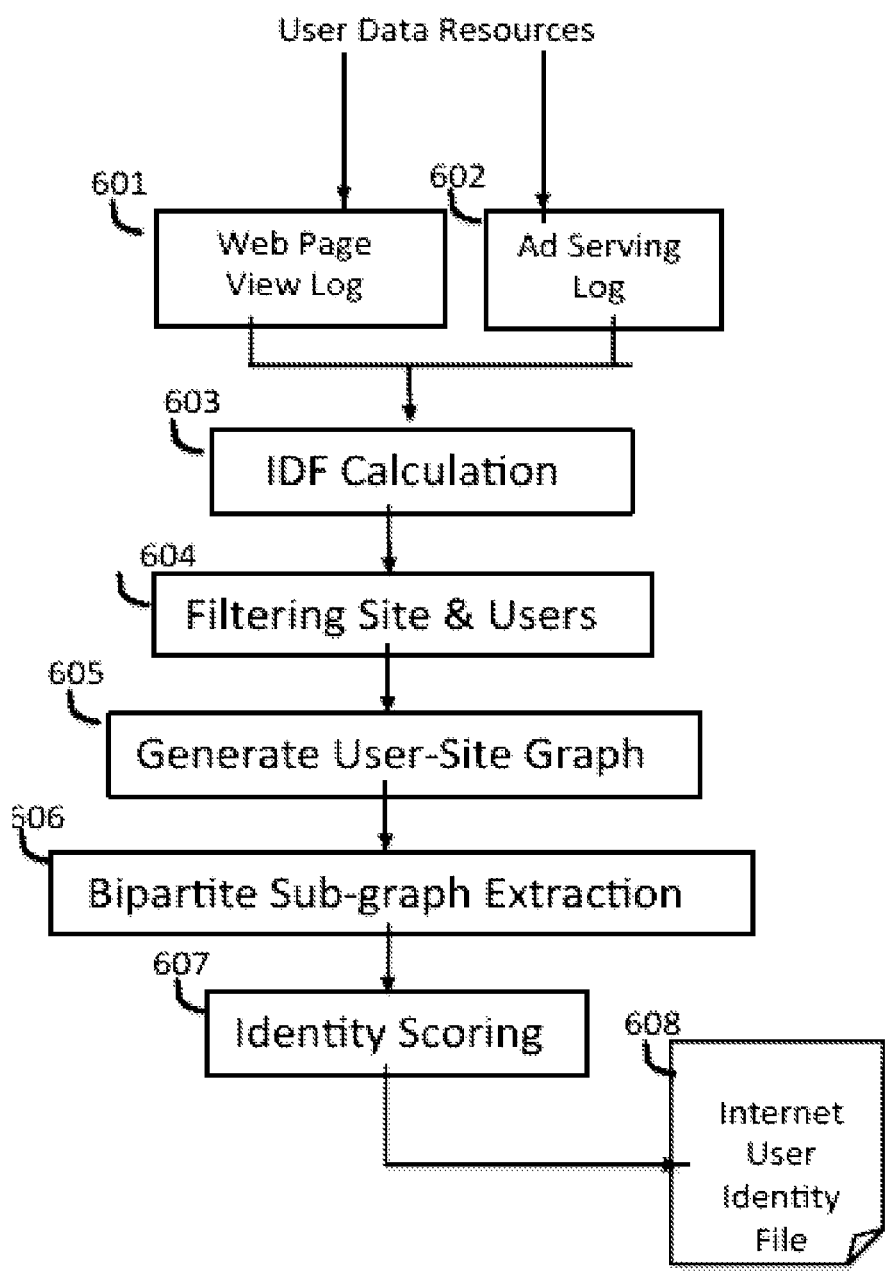
FIG. 6 illustrates a flowchart of a method for identifying users through common activity.

FIG. 6 illustrates a flow chart showing a method for identifying users. Initially, user data resources are collected in a web page view log in block 601 and/or an ad serving log in block 602. The user data resources include an identifier, such as a hardware ID, a cookie, a log in, or other identifying information, and information about activity associated with the identifier. The IDF is then calculated for the activity in block 603. The user data resources are then filtered to remove data resources associated with popular activities in block 604.

The filtered data is used to generate a user-site graph in block 605. A bipartite sub-graph is extracted from the user-site graph in block 606. The bipartite-sub graph is then scored in block 607 to create an internet user identity file 608, which lists groups of users and their corresponding scores. The internet user identity file 608 may then be filtered according to score with the remaining groups assumed to contain identifiers corresponding to a single user.

The following presents the pseudo code for implementing the described method.

Pseudo Code

```
START
A = Load the raw data (user visiting history)
B = Cleanse A by removing null values/missing values
C = From B, count global total unique users
D = From B, group sites
E = From D, count unique users for each site
F = From E, calculate IDF for each site
G = From F, filter sites by IDF (remove sites whose IDF values are below a threshold)
H = From D, build reverse index and generate site:user-list table
I = From H, join IDF with enumerated user-list
J = From I, enumerate candidate user-list based on parameter n
K = From J, group candidate user-list and merge the shared sites for each user-list
L = From K, calculate the weighted IDF values for each candidate user-list
M = From L, de-dup and merge the candidate user-list into final user-list that shares a
set of common sites
N = From M, rank user-list by the sigmoid score formula
END
```

The system and methods described previously provide recognizable benefits in identifying users based on their activity. In particular, the described system and methods provide for recognizing users independently of the device that they are using. The system and methods further provide an opportunity to more accurately target users.

From the foregoing, it can be seen that the present disclosure provides systems and methods for identifying users based on their activity. While various embodiments have been described above, it should be understood that they have been presented by way of example only, and not limitation. It will be apparent to persons skilled in the relevant arts that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:

accessing a user activity log comprising a plurality of identifiers and corresponding activity information for each identifier, the user activity log based on activities of mobile devices and Internet accounts of one or more users;

filtering the user activity log to exclude popular activity information associated with activities exceeding a popularity threshold and generate a filtered user activity log;

building an inverted index of the filtered user activity log, the inverted index having at least some activity information remaining in the user activity log after the filtering as a key and sets of identifiers associated with the at least some activity information as data;

enumerating possible combinations of identifiers to generate a plurality of potential user groups, wherein each potential user group (i) includes a plurality of users, (ii) is associated with a common set of one or more websites, and (iii) is generated based upon a determination that each of the plurality of users of the potential user group are determined to have visited the common set of one or more websites associated with the potential user group, wherein generating the plurality of potential user groups comprises:

generating a first potential user group, including a first plurality of users, in association with a first common set of one or more websites based upon a determination that the first plurality of users visited the first common set of one or more websites, wherein generating the first potential user group comprises grouping a first user of the first plurality of users and a second user of the first plurality of users into the first potential user group based upon (i) a determination that the first user visited a first website of the first common set of one or more websites and a second website of the first common set of one or more websites and (ii) a determination that the second user visited the first website and the second website; and generating a second potential user group, including a second plurality of users, in association with a second common set of one or more websites based upon a determination that the second plurality of users visited the second common set of one or more websites, wherein generating the second potential user group comprises grouping a third user of the second plurality of users and a fourth user of the second plurality of users into the second potential user group based upon (i) a determination that the third user visited a third website of the second common set of one or more websites and a fourth website of the second common set of one or more websites and (ii) a determination that the fourth user visited the third website and the fourth website;

scoring each potential user group of the plurality of potential user groups based on a quantity of websites in the common set of one or more websites for the potential user group;

determining that users of at least one potential user group of the plurality of potential user groups are associated with a common identity of a user based upon the scoring;

selecting advertisements to be targeted to the user; and controlling transmission of the advertisements to the user.

2. The method of claim 1 wherein the plurality of identifiers of the user activity log comprise at least one of hardware identifiers, cookies, or device profiles.

3. The method of claim 1, wherein the corresponding activity information of the user activity log comprises at least one of internet browsing activity, online shopping activity, or internet app usage.

4. The method of claim 1, wherein enumerating the possible combinations of identifiers comprises:
enumerating a limited number of user combinations;
grouping the user combinations according to common sites; and
merging two or more user combinations having one or more common sites.

5. The method of claim 1, wherein filtering the user activity log data comprises ranking at least some second activity information according to inverse popularity and selecting internet activities having a ranking higher than a threshold.

6. The method of claim 1, wherein scoring each potential user group of the plurality of potential user groups comprises:
scoring the first potential user group with a first score based upon a first quantity of websites in the first common set of one or more websites that the first plurality of users visited; and
scoring the second potential user group with a second score based upon a second quantity of websites in the second common set of one or more websites that the second plurality of users visited.

7. The method of claim 1, wherein scoring each potential user group of the plurality of potential user groups comprises scoring each potential user group based upon are scored according to a sum of an inverse document frequency for each common website of the common set of one or more websites associated with the potential user group.

8. A system for identifying a group of activities having a common user, the system comprising:
a processor configured to implement computer instructions; and
memory storing computer executable instructions, that when implemented by the processor, cause the system to perform functions comprising:
accessing data comprising a plurality of identifiers and corresponding activity information for each identifier;
filtering the data to exclude popular activity information associated with activities exceeding a popularity threshold and generate filtered data;
building an inverted index of the filtered data, the inverted index having at least some activity information remaining in the data after the filtering as a key and sets of identifiers associated with the at least some activity information as data;
enumerating possible combinations of identifiers to generate a plurality of potential user groups, wherein each potential user group (i) includes a plurality of users, (ii) is associated with a common set of one or more websites, and (iii) is generated based upon a determination that each of the plurality of users of the potential user group are determined to have visited the common set of one or more websites associated with the potential user group, wherein generating the plurality of potential user groups comprises:
generating a first potential user group, including a first plurality of users, in association with a first common set of one or more websites based upon a determination that the first plurality of users visited the first common set of one or more websites, wherein generating the first potential user group comprises grouping a first user of the first plurality of users and a second user of the first plurality of users into the first potential user group based upon (i) a determination that the first user visited a first website of the first common set of one or more websites and a second website of the first common set of one or more web sites and (ii) a determination that the second user visited the first website and the second website; and
generating a second potential user group, including a second plurality of users, in association with a second common set of one or more websites based upon a determination that the second plurality of users visited the second common set of one or more websites;
scoring each potential user group of the plurality of potential user groups based on a quantity of websites in the common set of one or more websites for the potential user group;
determining that users of at least one potential user group of the plurality of potential user groups are associated with a common identity of a user based upon the scoring;
selecting content to be targeted to the user; and
controlling transmission of the content to the user.

9. The system of claim 8 wherein the plurality of identifiers of the data comprise at least one of hardware identifiers, cookies, or device profiles.

10. The system of claim 8, wherein the corresponding activity information of the data comprises at least one of internet browsing activity, online shopping activity, or internet app usage.

11. The system of claim 8, wherein enumerating the possible combinations of identifiers comprises:
enumerating a limited number of user combinations;
grouping the user combinations according to common sites; and
merging two or more user combinations having one or more common sites.

12. The system of claim 8, wherein filtering the activity data comprises ranking at least some second activity information according to inverse popularity and selecting internet activities having a ranking higher than a threshold.

13. The system of claim 8, wherein scoring each potential user group of the plurality of potential user groups comprises assigning a first score to the first potential user group based upon a determination that the first potential user group is associated with a first quantity of common websites and assigning a second score, greater than the first score, to the second potential user group based upon a determination that the second potential user group is associated with a second quantity of common web sites, wherein the second quantity is greater than the first quantity are scored according to a quantity of common websites.

14. The system of claim 8, wherein scoring each potential user group of the plurality of potential user groups comprises scoring each potential user group based upon are scored according to a sum of an inverse document frequency for each common website of the common set of one or more websites associated with the potential user group.

15. A non-transitory computer readable storage media comprising computer executable instructions that when executed by a processor perform a method, comprising:

accessing a user activity log comprising a plurality of identifiers and corresponding activity information for each identifier, the user activity log based on activities of mobile devices and Internet accounts of one or more users;

filtering the user activity log to exclude popular activity information associated with activities exceeding a popularity threshold and generate a filtered user activity log;

building an inverted index of the filtered user activity log, the inverted index having at least some activity information remaining in the user activity log after the filtering as a key and sets of identifiers associated with the at least some activity information as data;

enumerating possible combinations of identifiers to generate a plurality of potential user groups, wherein each potential user group (i) includes a plurality of users, (ii) is associated with a common set of one or more websites, and (iii) is generated based upon a determination that each of the plurality of users of the potential user group are determined to have visited the common set of one or more websites associated with the potential user group, wherein generating the plurality of potential user groups comprises:

generating a first potential user group, including a first plurality of users, in association with a first common set of one or more websites based upon a determination that the first plurality of users visited the first common set of one or more websites, wherein generating the first potential user group comprises grouping a first user of the first plurality of users and a second user of the first plurality of users into the first potential user group based upon (i) a determination that the first user visited a first website of the first common set of one or more websites and (ii) a determination that the second user visited the first website; and generating a second potential user group, including a second plurality of users, in association with a second common set of one or more web sites based upon a determination that the second plurality of users visited the second common set of one or more websites;

scoring each potential user group of the plurality of potential user groups based on a quantity of websites in the common set of one or more websites for the potential user group;

determining that users of at least one potential user group of the plurality of potential user groups are associated with a common identity of a user based upon the scoring;

selecting content to be targeted to the user; and controlling transmission of the content to the user.

16. The non-transitory computer readable storage media of claim 15 wherein the plurality of identifiers of the user activity log comprise at least one of hardware identifiers, cookies, or device profiles.

17. The non-transitory computer readable storage media of claim 15, wherein the corresponding activity information of the user activity log comprises at least one of internet browsing activity, online shopping activity, or internet app usage.

18. The non-transitory computer readable storage media of claim 15, wherein enumerating the possible combinations of identifiers comprises:

enumerating a limited number of user combinations;

grouping the user combinations according to common sites; and merging two or more user combinations having one or more common sites.

19. The non-transitory computer readable storage media of claim 15, wherein filtering the user activity log comprises ranking at least some second activity information according to inverse popularity and selecting internet activities having a ranking higher than a threshold.

20. The non-transitory computer readable storage media of claim 15, wherein scoring each potential user group of the plurality of potential user groups comprises assigning a first score to the first potential user group associated with a first quantity of common websites and assigning a second score, greater than the first score, to the second potential user group associated with a second quantity of common websites, wherein the second quantity is greater than the first quantity.

* * * * *